US005282510A

United States Patent [19]

Pacher

[11] Patent Number: 5,282,510
[45] Date of Patent: Feb. 1, 1994

[54] DRILLING AND CHIPPING TOOL

[75] Inventor: Vinko Pacher, Munich, Fed. Rep. of Germany

[73] Assignee: Hilti Aktiengesellschaft, Furstentum, Liechtenstein

[21] Appl. No.: 976,715

[22] Filed: Nov. 16, 1992

Related U.S. Application Data

[63] Continuation-in-part of Ser. No. 800,577, Nov. 27, 1991, abandoned.

[30] Foreign Application Priority Data

Dec. 1, 1990 [DE] Fed. Rep. of Germany ....... 4038395

[51] Int. Cl.$^5$ ........................ B25D 16/00; B23B 45/16
[52] U.S. Cl. ........................................................ 173/48
[58] Field of Search .................................... 173/47, 48

[56] References Cited

U.S. PATENT DOCUMENTS 3,080,008 3/1963 Hendrickson ......................... 173/48
3,119,274 1/1964 Short ..................................... 173/48
3,123,156 3/1964 Gapstur ................................. 173/48
3,145,782 8/1964 De Bruin ............................... 173/48
3,507,337 4/1970 Chromy ................................ 173/48

FOREIGN PATENT DOCUMENTS 8801219 2/1988 Fed. Rep. of Germany ........ 173/48
963308 7/1964 United Kingdom .................. 173/48

*Primary Examiner*—Scott Smith
*Attorney, Agent, or Firm*—Anderson Kill Olick & Oshinsky

[57] ABSTRACT

A drilling and chipping tool includes a striker mechanism and a holder (10) for a tool bit. Blows are transmitted to the holder and the tool bit through an axially extending anvil (4) located in the tool. The anvil (4) can be connected to a shifting member (7) by a locking element (6). The shifting element (7) is axially displaceable by an actuation member (8). The axial displacement of the shifting member (7) moves the anvil (4) between a first position for transmitting blows and a second position for blocking the transmission of blows from the anvil (4) to the holder (10).

4 Claims, 2 Drawing Sheets

DRILLING AND CHIPPING TOOL

This is a continuation-in-part of Ser. No. 07/800,577, filed Nov. 27, 1991 now abandoned.

BACKGROUND OF THE INVENTION

The present invention is directed to a manually operated drilling and chipping tool including a striker mechanism and a tool bit holder. The striker mechanism delivers axially directed blows through an anvil to a tool bit clamped in the holder. The anvil has at least one recess into which a locking element can be positioned by a shifting member operable from the outside by a actuation member.

In a hammer drill disclosed in DE-PS 3 627 869 the blocking of blows by a pneumatic striker mechanism is achieved by hook shaped elements shiftable into a recess of a striking member. The striking member is thus held in an end position where it can not deliver blows to the tool bit.

The hook shaped elements are movable in the radial direction. An actuation device operable from the outside includes an eccentric deformation in the radial direction in its interior circumferential region, so that the axial stroke of a pin shaped element can be controlled. Accordingly, axial movement of the pin shaped element can be achieved by turning the actuation device in the circumferential direction, whereby the pin shaped element controls the radial movement of the hooked shaped elements. Since the striking member can be locked only in its leading position, it must be designed so that it can press the hooked shaped elements which are biased by spring means in the radial direction. The elements are displaced radially apart over an inclined plane, so that the inclined plane can drop into a recess in the striking member following on the inclined plane. As a result, the striking member can be locked only when it is moved by the striking mechanism in the working or operational direction.

SUMMARY OF THE INVENTION

Therefore, it is the primary object of the present invention to provide a locking device whereby the anvil delivering axial blows can be displaced into a position where the blows are not effectively directed. The locking action can be achieved without placing the entire tool into operation.

In accordance with the present invention, an actuation member includes means for axially displacing a shifting member.

When the actuation member is operated, initially the shifting member is rotated through a smaller angle into a rotationally locked position and then is moved in the axial direction within the actuating member. As a result, the anvil connected to the switching member by a locking element can be shifted into a position where it does not convey axially directed blows. This position of the anvil can be achieved by the tool operator exclusively by operating the actuation member, without having to start up or place the entire tool in operation.

The tool is advantageously distinguished where the actuation means is at least one control curve or cam arranged on the inside of the actuation member. The movement of the actuation means is transmitted to the shifting member by a control cam.

Preferably, the control curve is a helically shaped groove. By turning the actuation member in the circumferential direction, such movement is translated into axial movement of the shifting member. The ratio of the axial movement of the shifting member to the turning angle of the actuation member can be defined by the pitch of the helically shaped groove.

Another advantage of the invention is that parts of the shifting member engage in the helical groove. This interaction achieves guidance and precise motion of the shifting member by the actuation member.

Parts of the shifting member are preferably cams arranged in the circumferential region of the shifting member. Expediently, these cams correspond in shape to the cross section and pitch of the helically shaped groove. By arranging these cams in the circumferential direction, their fabrication is simple and economical.

The present invention is especially suited to a drilling and chipping tool with a removable tool bit holder. Reversing or switching off the striking operation of the anvil in the tool is eliminated. Particularly in identical working operations, extending over a long period of time, it is advantageous if the operator does not constantly have to monitor whether the correct adjustment has been made on the tool.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
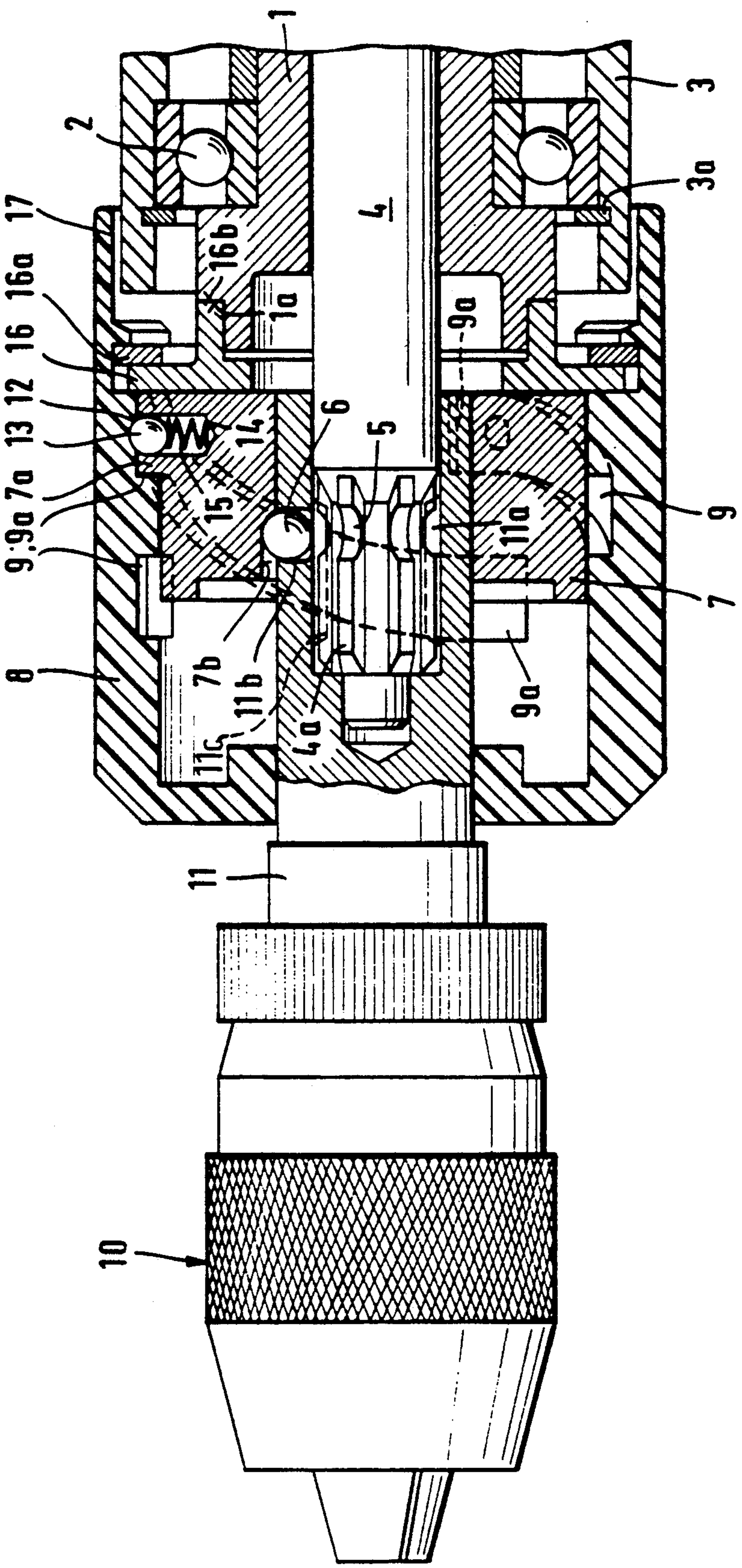
FIG. 1 is a partial side elevational view of the leading end of a drilling and chipping tool with a tool bit holder in the unlocked position.

In FIG. 1 the leading end region of a drilling and chipping tool is shown with an axially extending guidance sleeve 1. Guidance sleeve 1 is supported in the tool housing 3 so that it can rotate in two ball bearings 2. A stop shoulder for one of the ball bearings 2 in the housing 3 is formed by a circlip 3*a*. In the trailing end part of the guidance sleeve 1 there is a known pneumatic striking mechanism with a striking piston, not shown.

In the leading end region of the guidance sleeve 1, an anvil 4 is axially displaceably supported. Adjacent its leading end, anvil 4 has axially extending teeth 4*a* for effecting rotational entrainment and transmitting torque. A circumferential groove 5 is formed in the anvil 4 in the trailing end region of the teeth 4*a*. Preferably, the groove is circularly shaped and corresponds to the shape of a locking element 6, shown as a ball. The shape of groove 5 aids in displacing the locking element 6 to its unlocked position.

A removable tool bit holder 10 designed especially for pure rotational movement is fitted into the leading end of the tool. In FIG. 1 the tool bit holder is not secured to the tool, since the locking element 6 is not secured in the groove 5. Tool bit holder 10 has a tool bit holder shank with a blind bore or recess 11*a* in its trailing end region. Interior teeth 11*c* designed to match the teeth 4*a* on the anvil, are arranged in the axially extending bore 11a. In FIG. 1 the locking element 6 is located in the unlocked position in the tool bit holder shank 11. Several locking elements 6 can be used. Preferably, three locking elements 6 are arranged in the circumferential region of the tool bit holder shank 11 spaced apart at an angle of 120°.

The locking element 6 is guided in a radially extending bore 11b in the holder shank 11 in which the ball or locking element 6 can be moved in the radial direction. Transversely extending bore 11b is located in the trailing end region of the tool bit holder shank 11. The diameter of the ball 6 exceeds the wall thickness of the tool holder shank 11 in the region of the bore or recess 11a. The shifting member 7 includes control means 7b, whereby the locking element 6 can be engaged radially inwardly or disengaged radially outwardly. Since several locking elements may be provided spaced apart in the circumferential direction, then such locking elements could also be controlled by the shifting member 7. The shifting member 7 is operably displaced by an actuation member 8 positioned at the leading end of the housing 3 at the outside of the tool.

The shifting member 7 is basically cylindrically shaped and essentially axially displaceable within the actuation member 8. At least one cam 7a is arranged on the outer circumferential surface of the shifting member 7.

In its interior surface, the actuation member 8 has helically shaped grooves 9 and in transverse cross section the grooves are rectangularly shaped. Correspondingly, the cams 7a have a complementary shape and engage into the helically shaped grooves 9. At their opposite ends, each groove 9 has a region 9a extending perpendicularly of the axis of the tool bit holder, that is, without any incline or pitch. This region 9a forms a self-locking feature against turning of the actuation member 8 relative to the shifting member 7 when axial loading exists.

To obtain pure rotational movement of a drill bit in the holder 10, the anvil is placed and locked in a position where blows can not be directed against the tool bit holder.

This locks the shifting member 7, the actuation member 8, the tool bit holder 10 and shank 11 in the tool, and these parts cannot fall out of or from the tool.

Figure 2:
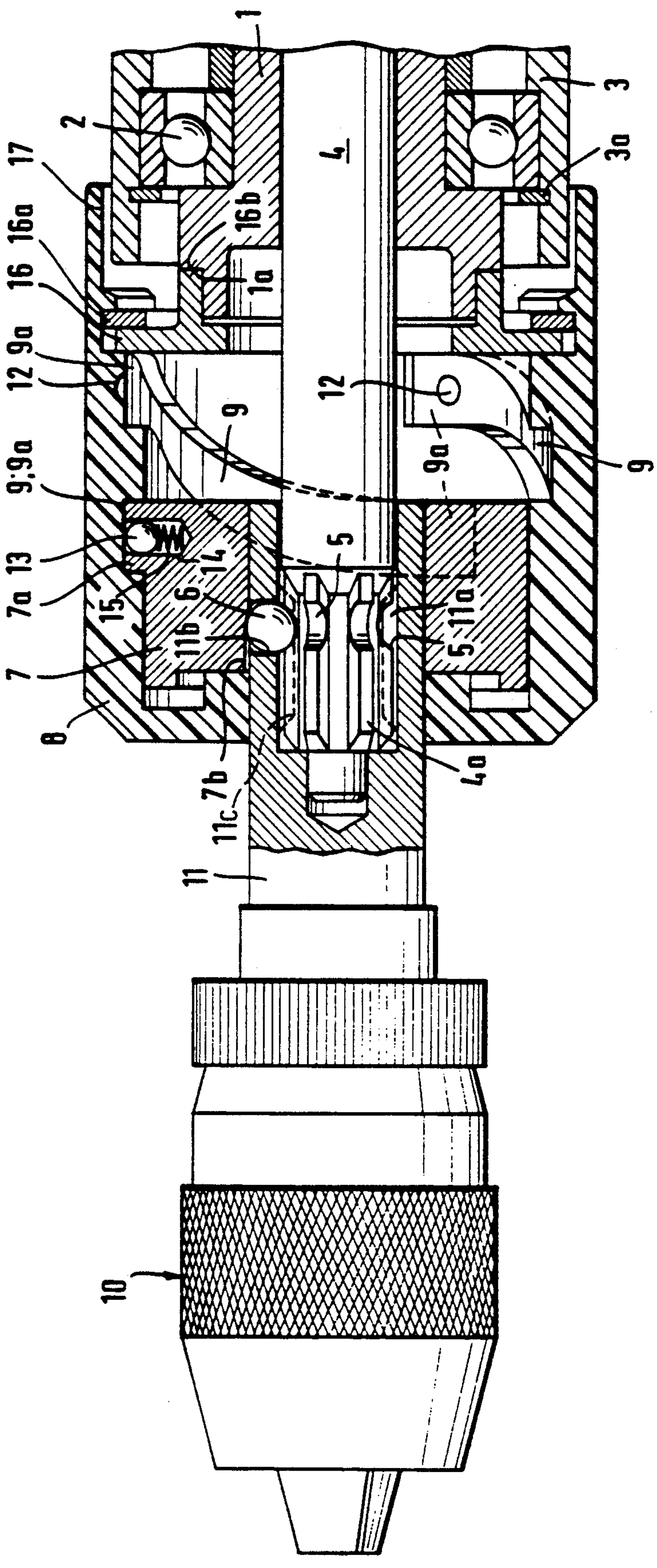
FIG. 2 is a view similar to FIG. 1 but with the tool holder in the locked position.

In FIG. 2 the locking element 6 is shown engaged in the circumferential groove 5 of the anvil 4. The shifting member 7 has been axially displaced from the position shown in FIG. 1 by turning the actuation member 8 about the axis of the anvil 4 and the tool bit holder shank 11. Since the shifting member is connected to the holder shank 11 and to the anvil 4 through the locking element 6, axial movement of all of these parts occur when turning the actuation member 8. The anvil 4 is displaced into the position where the application of blows is ineffective and it is retained in that position. Accordingly, the drilling and chipping tool can be operated with pure rotational movement. The axial displacement of the anvil is effected by turning the actuation member 8, the tool does not have to be turned on.

In the basic or unlocked position of the tool, the shifting member 7 is located at the trailing end of the actuation member 8, note FIG. 1. The locking element 6 in the form of a ball is in the unlocked position. The tool bit holder shank 11 is placed on the leading end region of the anvil 4 so that the two sets of teeth 4a, 11c, mesh. An intermediate disk 16 is located in widened circumferential recess 17 in the trailing end region of the actuation member 8, and the disk is fixed in position in the recess 17 by circlips 16a. The intermediate disk comprises a stop collar 16b abutting against an end face 1a of the guide sleeve 1. As mentioned above, the actuation member 8, the shifting member 7, the tool bit holder 10 and shank 11 are not yet locked to the tool and can be slid out of the tool.

By turning the actuation member 8 in the circumferential direction, the shifting member 7 rotates along with the actuation member, since the shifting member has not yet been locked to the anvil by the locking elements. The shifting member 7 moves into the position shown in FIG. 2 and the locking element 6 moves into the locked position. The ball shaped locking element 6, engages in the circumferentially extending recess 5 in the anvil 4.

As shown best in FIG. 2, a recess 12 is arranged in the end region of the helically shaped groove 9, that is, the part of the groove extending without pitch or incline, and an anti-rotational securing element 13 mounted in the shifting member 7 can be displaced into the recess 12. The anti-rotation securing element 13 is a spring biased ball arranged in a blind bore 14 in the cam 7a of the shifting member 7. The blind bore 14 extends in the radial direction. The securing element or ball 13 is guided in the bore 14 and presses against a spring 15 located within the bore. The spring abuts against the bottom of the bore. By turning the actuation member 8, the ball 13 is shifted out of the recess 12 at the end of the helically shaped groove 9 and is shifted into the bore 14 in the cam. Accordingly, the shifting member 7 is released for axial displacement relative to the actuation member 8, that is, the actuation member can continue to rotate, but the shifting member only moves axially. The turning of the actuation member 8 does not rotate the shifting member 7, because the shifting member is connected by the locking element 6 to the shank 11 which, in turn, is in meshed engagement with the anvil 4. The anvil 4 is driven by a drive motor (not shown) and holds the anvil, the shank and the shifting member from turning when the actuation member is moved.

With further turning of the actuation member 8, the cam 7a leaves the end region 9a of the groove 9 arranged without pitch or incline, and moves into the helically shaped region of the groove. As a result, there is relative motion of the shifting member 7 in the axial direction with respect to the actuation member 8.

At the opposite end of the helically shaped region there is located another end region 9a of the groove 9 extending without pitch or incline whereby a self locking effect is achieved against unintended turning of the actuation member 8.

When the forward position of the shifting member 7 is reached, as in FIG. 2, the anvil 4 is locked into position so that the direction of blows is ineffective. The rotational movement produced by the drive and transmitted to the anvil 4 is conveyed through the anvil to the tool bit holder shank 11 and then to a tool bit, note shown, clamped in the holder 10. The release or unlocking of the anvil takes place in a reverse sequence to that described above. When the shifting member 7 is returned from the FIG. 2 position to the FIG. 1 position, the combination of the actuation member 8, the shifting member 7 and the tool bit holder 10 and shank 11 can be removed from the tool. In the FIG. 1 position the locking element 6 is displaced radially outwardly by pulling axially outwardly on the tool bit holder 10 with the shaped groove 5 displacing the locking element 6 radially outwardly releasing the locking engagement of the shank 11 with the anvil 4.

While specific embodiments of the invention have been shown and described in detail to illustrate the application of the inventive principles, it will be understood that the invention may be embodied otherwise without departing from such principles.

I claim:

1. Manually operable drilling and chipping tool and a holder for a tool bit securable to said tool for operation of said tool only as a rotary drill, said tool comprising a tool housing, an axially extending leading end section mounted on and extending axially outwardly from said tool housing and arranged to receive said holder, said holder having an axially extending holder shank insertable into an opening formed by said leading end section, an axially extending anvil for transmitting one of drilling motion and combined drilling and chipping motion located within said housing and said leading end section, said anvil has at least one circumferentially extending recess therein, a locking element displaceable into the recess in said anvil by a shifting member, said leading end section comprises said shifting member and an actuation member laterally enclosing said shifting member and mounted on said housing, wherein the improvement comprises that said holder shank has a free end with an axially extending bore therein, said anvil has an axially extending front section insertable into said bore in said holder shank and said front section includes said recess, said actuating member and said shifting member include interengaging means for producing axial movement of said shifting member relative to said actuating member for axially displacing said anvil locked to said shifting member whereby the anvil is displaced to a position for transmitting only drilling motion to said holder, and said interengaging means of said actuating member and shifting member comprises at least one control cam located on an inside surface of the actuation member facing and engaging an outside surface of said shifting member.

2. Manually operable drilling and chipping tool, as set forth in claim 1, wherein said control cam is a helically shaped groove extending in the axial direction of said anvil axis.

3. Manually operable drilling and chipping tool, as set forth in claim 2, wherein said shifting member has at least one part thereon engageable within the helically shaped groove.

4. Manually operable drilling and chipping tool, as set forth in claim 3, wherein the at least one part of the shifting member comprises cams located in an outer circumferentially extending region of said shifting member.

* * * * *